April 6, 1948.  W. HOWALD  2,439,003

TRANSMISSION MECHANISM

Filed Sept. 11, 1944  6 Sheets-Sheet 1

Inventor
Werner Howald
by Singer, Ehlert, Stern & Carlberg
Attorneys

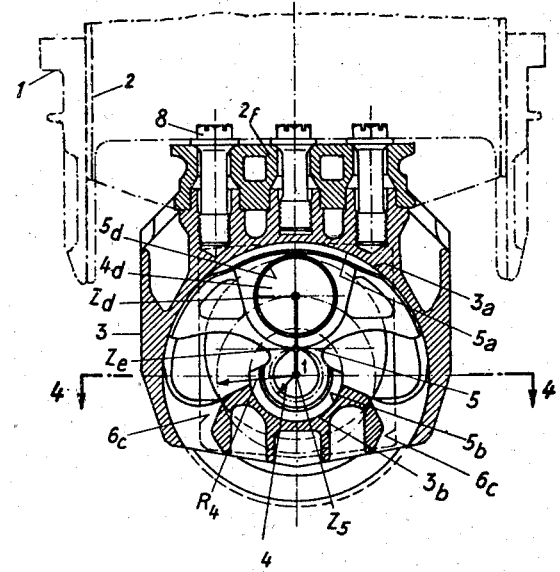

Inventor
Werner Howald

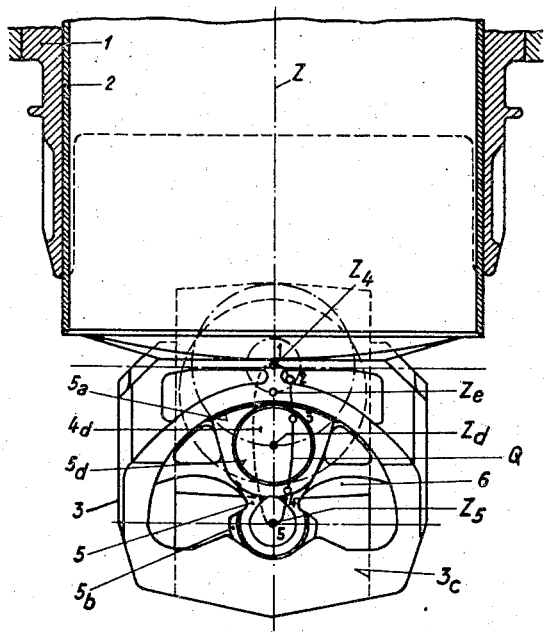
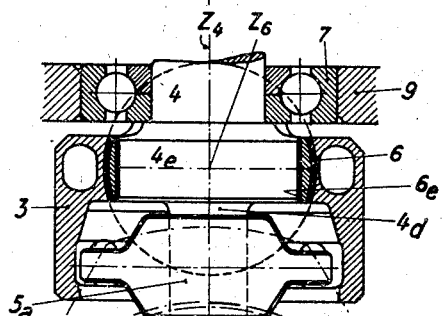
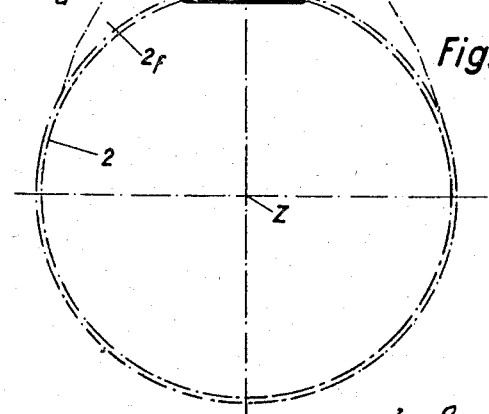

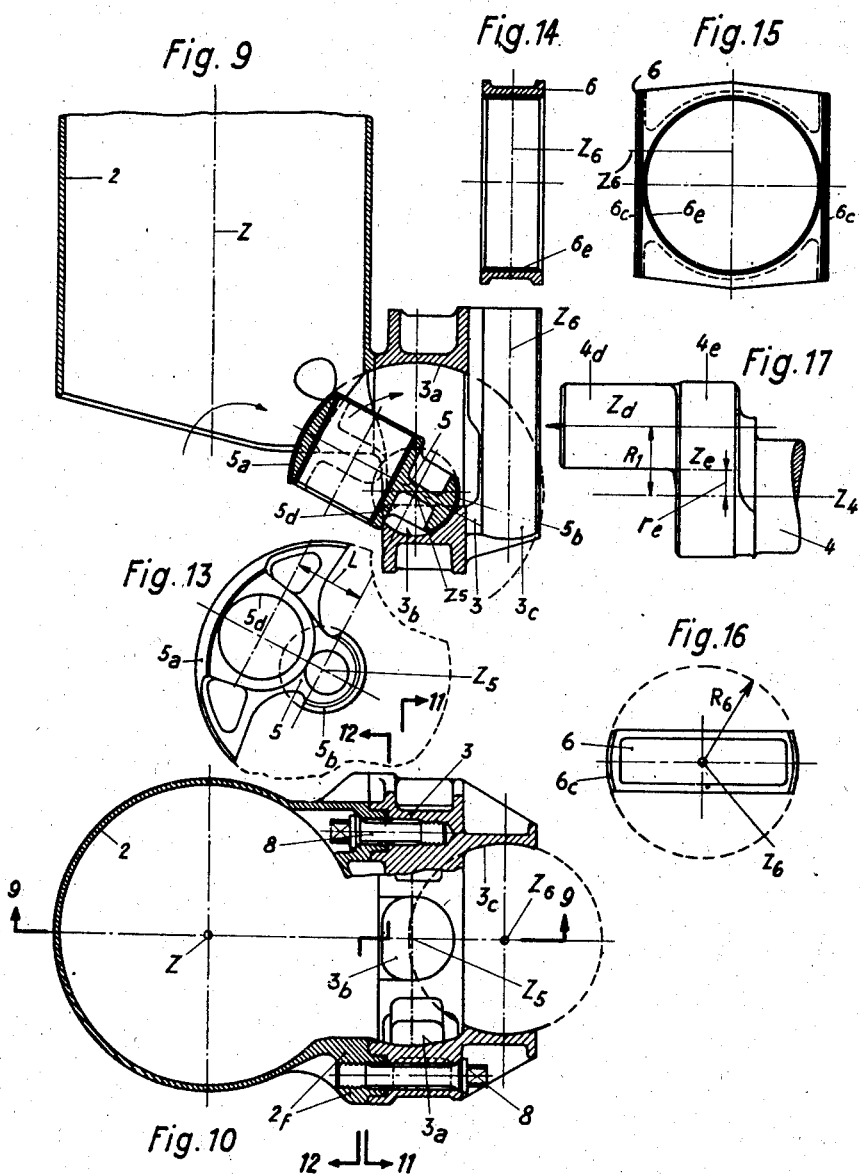

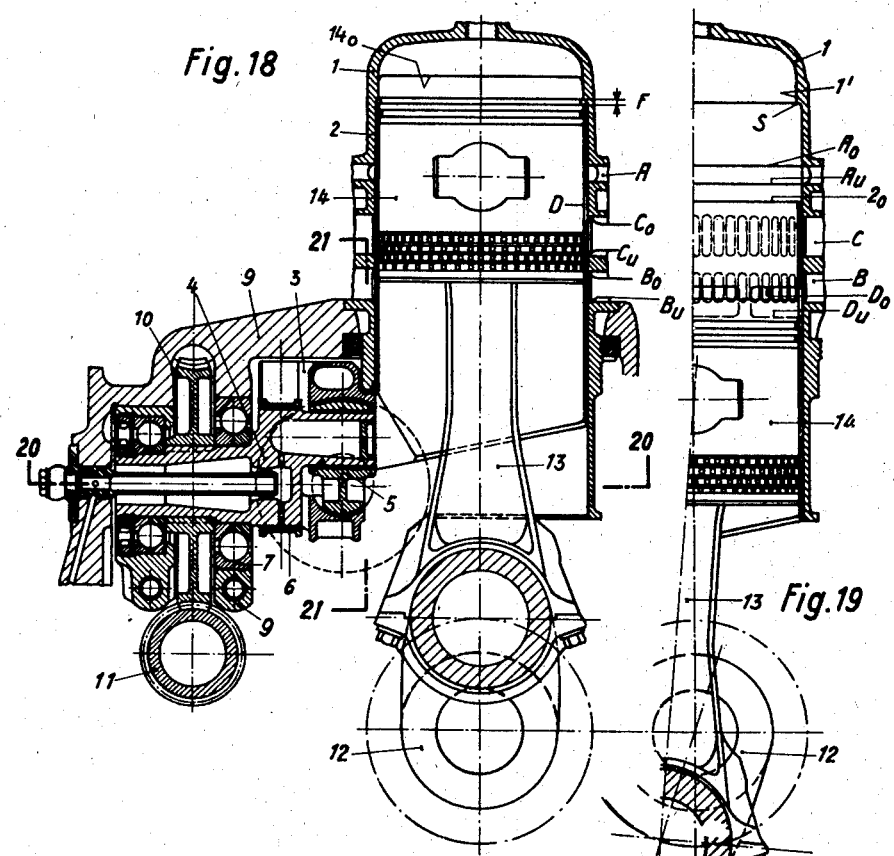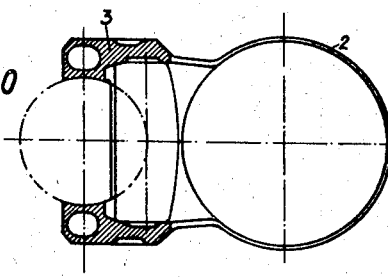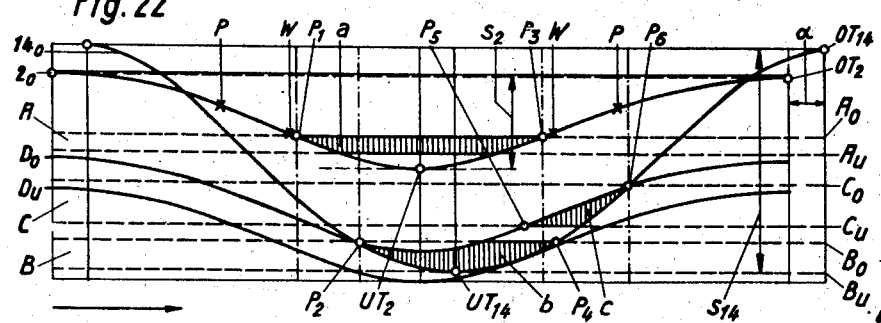

Patented Apr. 6, 1948

2,439,003

UNITED STATES PATENT OFFICE 2,439,003

TRANSMISSION MECHANISM

Werner Howald, Zurich, Switzerland

Application September 11, 1944, Serial No. 553,583
In Germany September 14, 1943

6 Claims. (Cl. 74—50)

The present invention relates to a new and improved two stroke combustion engine with tubular slide valve and more particularly to the specific means to actuate the tubular slide.

The main object of the invention consists in the provision of simple means to attain a high precision of the tubular valve movements at any speed, said means taking up but little space.

With these and other objects in view the invention consists in the particular construction and arrangement of parts as described in the following specification and set out in the claims.

In the accompanying drawings:

Fig. 3 shows the valve gear in a section on line 3—3 of Fig. 1, and

Fig. 4 is a cross-section taken on line 4—4 of Fig. 3.

Figs. 7 and 8 are again cross-sections as shown in Figs. 3 and 4 showing the parts of the valve gear with the piston at its lower dead point position.

Fig. 9 shows in cross section parts of the valve gear taken on line 9—9 of Fig. 10 illustrating the assembling of parts.

Fig. 10 is a horizontal section on line 10—10 of Fig. 11 parts being omitted.

Fig. 12 is a section taken on line 12—12 of Fig. 10 showing the attachment of the follower to the tubular slide valve.

Fig. 13 is a side elevation of a connecting member interconnecting the tubular slide valve with the cam shaft.

Figs. 14, 15 and 16 show in cross-section and in plan view and in side elevation respectively the crank slide.

Fig. 17 is a side view of part of the cam shaft.

Figs. 18 and 19 illustrate in sectional elevations of the engine the operation of the valve gear.

Figs. 20 and 21 are sections taken on the lines 20—20, 21—21 of Fig. 18, parts of the gear being left out, and Fig. 22 is a diagram showing the co-operation of the piston of the working cylinder with the tubular slide.

Figure 1:
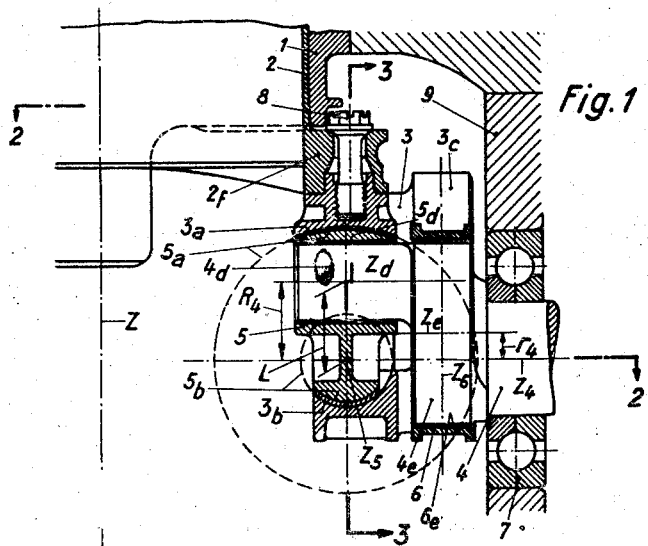
Fig. 1 shows part of the cylinder of a two-stroke combustion engine with tubular slide valve and the operating gear therefor in sectional elevation.
Figure 2:
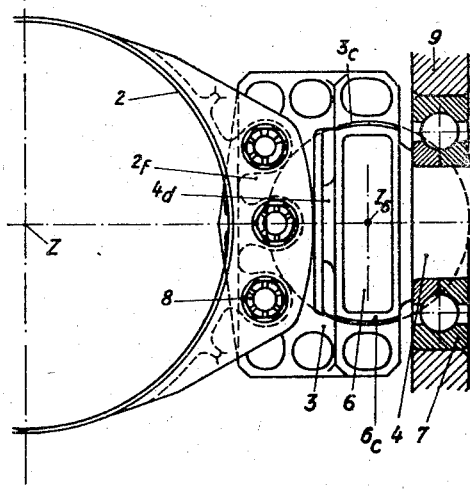
Fig. 2 is a cross-section on the line 2—2 of Fig. 1.
Figure 11:
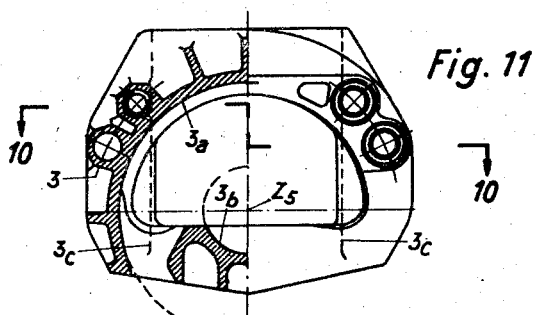
Fig. 11 illustrates partly in section on line 11—11 of Fig. 10 and partly in elevation a follower attached to the tubular slide valve.

In Figs. 1, 3, 4, 9, 10, 13 of the drawings 1 denotes the working cylinder of a two-stroke combustion engine with a tubular slide valve, 2 denotes the tubular slide valve, 3 denotes a follower connected to the tubular slide valve, 4 denotes a crankshaft with an eccentric 4e, the latter carrying a crank pin 4d. On the crank pin 4d a connecting member 5 is rotatably mounted. The connecting member 5 (Fig. 1) is provided with ball shaped bearing faces 5a, 5b sliding on ball shaped faces 3a and 3b of the follower 3. On the eccentric 4e a slide 6 with bore 6e is rotatably mounted (Figs. 1, 14 and 15) having two parallel straight cylindrical bearing faces 6c (Figs. 15, 16) fitting into the cylindrical bearing faces 3c (Figs. 4, 9, 10) of follower 3. The crankshaft 4 runs in ball bearings 7 of the engine frame 9. The follower 3 is connected to the tubular slide 2 by screws 8 (Figs. 1, 2 and 3). On the crankshaft 4 (Fig. 18) a worm wheel 10 is fastened with which the worm 11 is in engagement. The worm 11 is driven from the crankshaft of the engine by means of a set spur gears (not shown in the drawings) in such a manner that the crankshaft 4 performs the same number of rotations per minute as the crankshaft 12. A connecting rod 13 interconnects the crankshaft 12 with the working piston 14 of the engine. The piston 14 transmits not only work done by the expanding gases in the cylinder 1 onto the crankshaft 12 but it governs the inlet of fuel into cylinder by its upper edge 14o in combination with the inlet slots D in the tubular slide 2 and the slots B for the scavenging air and the slots C of cylinder 1 for the overcharge. The exhaust of the gases from the combustion space is controlled by the upper edge 2o of the tubular slide 2 co-operating with the exit slots A in the working cylinder 1.

The manner of operation of the new drive for the tubular controlling slide 2 is illustrated in Figs. 3 to 8. The tubular slide 2 is rigidly connected to the body of the follower 3 by three screw bolts 8 running parallel to the axis Z of the cylinder 1. The tubular slide 2 and the follower 3 are not only freely movable in the bore of the cylinder 1 parallel to its axis, but they are moreover freely rotatable about the cylinder axis Z. The tubular slide 2 is moved by the crankshaft 4, the member 5 and the slide 6. In the position of the parts shown in Figs. 3 and 4, the tubular slide 2 with the follower 3 and the parts 5 and 6 are in their uppermost dead point position. The axes Zd of the crank pin 4d, Ze and Z5 are in one common plane passing through the axis Z of the cylinder 1 and through the axis Z4 of the crankshaft 4.

Figure 5:
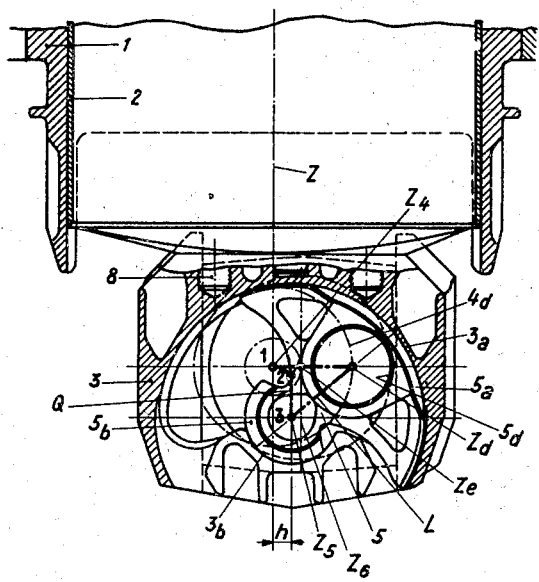
Figs. 5 and 6 are sections taken on the same lines as in Figs. 3 and 4 but showing the parts of the valve gear in a modified position.
Figure 6:
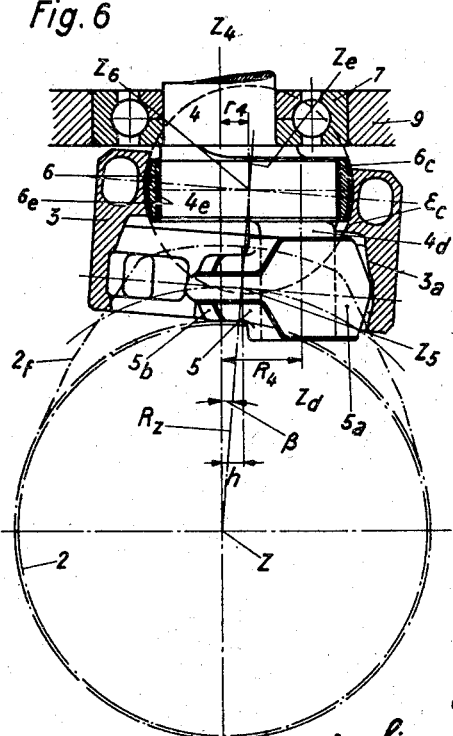

In the position of the parts shown in Figs. 5 and 6 the crankshaft 4 has been turned for about 90° and therewith the eccentric 4e. The throw R4 of the crankpin 4d and the throw r4 of the eccentric 4e has been moved out of their upper dead point position into their outermost sideward position out of the plane passing through the axis Z of the cylinder 1 and the axis Z4 of the crankshaft 4. The tubular slide 2 and therewith the follower 3 have been turned about an angle $\beta$ out of their middle position, while the tubular slide 2 and the follower 3 have been moved downwardly by the connecting member 5 in conformity to the downward movement of the centre Z5 of the connecting member 5. The centre Z5 of the connecting member 5 which forms a fast point relative to the tubular slide 2 and the follower 3 passes thereby through the points 1, 2, 3 of the path Q (Fig. 5). The slanting position of the follower 3 which is thereby produced relative to the crankshaft 4, the member 5 and the slide 6 is possible owing to the ball shaped faces of the member 5 and the cylindrical bearing faces 6c of the slide 6 and 3c in the follower 3. The latter as well as the slide 6 perform simultaneously a small axial displacement on their cylindrical gliding faces 4d and 4e on the crankshaft 4, as the centre Z5 of the ball shaped face 5a, 5b, viz. 3a, 3b as well as of the axis Z6 cylindrical running faces 3c, 6c of the follower 3 and of the slide 6 in a circular path round the axis Z of the cylinder.

In the Figs. 7 and 8 the parts are shown in that position which they have attained by turning the crankshaft 4 for another 90°. The parts have attained their lower dead point positions and their axes are again in a common plane passing through the axis of the cylinder 1 and the axis of the crankshaft 4. The centre Z5 of the connecting member 5 has passed on over the points 3, 4 and 5 of the path Q into the lower dead point position.

From Figs. 9, 13, 14, 15 it might be seen by the arrows how the connecting member 5 and the slide 6 and the crankshaft 4 and the follower 3 are assembled. As illustrated in Fig. 9 the connecting member 5 is placed on to the ball shaped face 3c of the follower 3 in inserting it from the side of the tubular slide 2 in nearly horizontal position and with the small ball face 5b in advance. The member 5 is then turned into the vertical working position. The member 5 with its ball shaped bearing faces 5a, 5b fits into the corresponding ball shaped bearing faces 3a and 3b of the follower. The slide 6 is now inserted from the top or from below into the follower 3 so that its cylindrical bearing faces 6c pass into the cylindrical bearing faces of the follower 3. Now the pin of the crankshaft 4 is inserted (Fig. 17) with its cranked part in advance through the bore 6c of the slide 6 until the cylindrical crank pin 4d enters the cylindrical bore 5d of the connecting member while the cylindrical shank 4a comes to rest in the cylindrical bore of the slide 6. By placing all the said parts from below into the working cylinder 1 and by securing the crankshaft 4 in its bearings 7 of the machine frame 9 as illustrated in Fig. 9 the whole drive will be assembled.

From the above said it appears that the ball shaped faces 5a and 5b envelop the cylindrical bearing faces of the crank pin 4d and that the part of the connecting member 5 containing the ball shaped bearing faces 5a and the cylindrical bore 5d is longer in the direction of its axis as that part of the connecting member 5 containing the ball shaped face 5b.

In consideration of the effect of the centripetal force exerted by the cylindric bearing face 3c of the follower 3 on the slide 6 by the rotation of the tubular slide 2 and the follower 3 about the axis Z of the cylinder 1 the axis Z6 running parallel to the axis Z of the working cylinder 1 runs not through the middle of the slide 6 but is placed out of centre into that portion nearer to the tubular slide 2.

The controlling of the outlet and inlet ports is shown in the diagram, Fig. 22, and in the Figures 18, 19, 20 and 21. In the diagram shown in Fig. 22 the time of a whole turn of the crankshaft 12 is marked by horizontal lines and on vertical lines are noted the position of the co-operating edges of the ports of cylinder 1 of tubular slide 2 and of working piston 14. The stationary edges of the cylinder 1 appear as straight horizontal lines parallel to the axis denoting time while the movable controlling edges of the tubular slide 2 and of the working piston 14 appear as curved lines. The arrow denotes the direction of rotation of the crankshaft 12 and the crankshaft 4. The ordinates in the vertically shaded parts $a$, $b$, $c$ indicate the dimension of the open cross sections which multiplied by the corresponding breadth give the cross section area of the exit A for the exhaust gases of the inflow B of the scavenging air and of the entry C of the supercharged air or of the supercharged mixture of air with fuel. OT2 is the outer and UT2 the inner dead point of the tubular slide 2; OT14 is the outer and UT14 is the inner dead point of the working piston 14. The stroke of the slide 2 is denoted by $s2$ and the stroke of the working piston 14 is denoted by $s14$. The point of the maximal speed of the tubular slide 2 is marked with W. F denotes a point of maximal decrease or increase of the speed of the tubular slide 2 in advance or after the outer dead point.

The piston 14 is moved by the pressure of the ignited charge from the upper dead point OT14 towards the lower dead point UT14 and drives by means of the connecting rod 13 the crankshaft 12. The tubular slide 2 is turned in the same direction as the crankshaft 12 in advance by an angle $\alpha$. At about ⅓ of the whole stroke in advance of the lower dead point UT14 of the working piston 14, the upper edge 2o of the tubular slide 2 and the stationary upper edge Ao of the exhaust port A meet (Fig. 22, point P1). As tubular slide 2 has attained at this zone its greatest speed (Fig. 22) the gap between the upper edge of the tubular slide 2 and the upper edge Ao of the exhaust ports A is quickly increased. The exhaust gases pass with but little throttling loss through the outlet A either to the blades of the running wheel of a turbine or directly by means of repulse nozzles into the atmosphere. As the pressure in the working cylinder 1 decreases to the pressure of the scavenging air the upper edge 14o of the working piston 14 meets the upper edge Do of the inlet slots D in the tubular slide 2 and the stationary upper edge Bo of the slot B for the inlet of the scavenging air into the working cylinder 1 (Fig. 22, point P2). At this zone the speed of the working piston 14 is in excess of the speed of the tubular slide 2 the width of the open portion between the upper edge 14 of the working piston 14 and of the upper edge Do of inlet slot of the tubular slide 2 increases very quickly. The remaining gases of the combustion in the combustion space will be swept out by the scavenging air entering through the slots A. The scavenging of the gases of combustion is keeping on until the tubular slide 2 and after that the working piston 14 have passed their dead point positions and until the tubular slide 2 has reached and passed over by its upper edge 2o the upper edge of the exit slot A of the working cylinder 1 (Fig. 22, point P3). Shortly after that the inflow of scavenging air into the combustion space is stopped, the inlet slot B of the working cylinder 1 being closed by the tubular slide 2. Shortly before the closing takes place the inlet slot D of the tubular slide 2 opens the ingress of the supercharge of air or of supercharge and air-fuel-mixture through the slots C in the cylinder 1. By closing the slots B for the scavenging air after the exhaust slots A and owing to the fact that the tubular slide 2 has reached its speed in its upward direction, the ingress slots B for the scavenging air are closed very rapidly while the working cylinder 1 has received its charge before the supercharging is performed. At the same time or shortly in advance the slots C for the supercharging of air or of air-fuel-mixture had been opened (Fig. 22, points P4 and P5). At about ⅔ of its stroke in advance of its upper dead point OT14 the working piston 14 has again reached with its upper edge 14o the upper edge Do of the inlet slots D of the tubular slide 2. The inflow of supercharge air or of supercharge air-fuel mixture into the working cylinder 1 is closed by the passing over of the upper edge Co over the slots C for the influx of the supercharge (Fig. 22, point P6). As the working piston 14 has attained its highest speed during its upward stroke at this zone and as the speed of the tubular slide 2 is nearly at zero, the closing of the supercharging slots C takes place very quickly.

What I wish to secure by U. S. Letters Patent is:

1. In a driving mechanism, the combination comprising a crank shaft provided with an eccentric disc and a crank pin on said eccentric disc, a follower fixedly attached to a driven member and provided with two pairs of axially spaced bearing surfaces, a slide rotatably mounted on said eccentric disc and slidably engaging one pair of said bearing surfaces on said follower, and a connecting member rotatably mounted on said crank pin and slidably engaging the other pair of said bearing surfaces on said follower.

2. In a driving mechanism, the combination comprising a crankshaft provided with an eccentric disc and a crank pin on said eccentric disc, a follower fixedly attached to a driven member and provided with a pair of concentrically arranged cylindrical bearing surfaces and axially spaced therefrom with a pair of spherical bearing surfaces, a slide rotatably mounted on said eccentric disc and slidably engaging said pair of cylindrical bearing surfaces on said follower, and a connecting member rotatably mounted between its ends on said crank pin and having both its ends provided with spherical bearing surfaces engaging the spherical bearing surfaces on said follower.

3. In a driving mechanism, the combination comprising a crankshaft provided with an eccentric disc and a crank pin on said eccentric disc, a follower fixedly attached to a driven member and provided with a pair of concentrically arranged cylindrical bearing surfaces and axially spaced therefrom with a pair of spherical bearing surfaces of different radii of curvature, a slide rotatably mounted on said eccentric disc and slidably engaging said pair of cylindrical bearing surfaces on said follower, and a connecting member rotatably mounted between its ends on said crank pin and having both its ends provided with spherical bearing surfaces engaging the spherical bearing surfaces on said follower, the total length of said connecting member between the spherical end faces thereof being less than the diameter of said eccentric disc.

4. In a driving mechanism, the combination comprising a crankshaft provided with an eccentric disc and a crank pin on said eccentric disc, a follower fixedly attached to one end of a cylindrical driven member and provided with two pairs of axially spaced internal bearing seats, one pair of said bearing seats being cylindrical and arranged concentrically and equidistant about an axis extending parallel to the axis of said sleeve member, the other pair of said bearing seats being spherical and having different radii of curvature, a slide rotatably mounted on said eccentric disc and having exterior cylindrical bearing surfaces which slidably engage the pair of cylindrical internal bearing seats on said follower, and a connecting member rotatably mounted on said crank pin and having a pair of exterior spherical bearing surfaces in operative engagement with said pair of internal bearing seats on said follower.

5. In a driving mechanism, the combination comprising a crankshaft provided with an eccentric disc and a crank pin on said eccentric disc, a follower fixedly attached to one end of a cylindrical driven member and provided with two pairs of axially spaced internal bearing seats, one pair of said bearing seats being cylindrical and arranged concentrically and equidistant about an axis extending parallel to the axis of said driven member, the other pair of said bearing seats being spherical and having different radii of curvature, a slide rotatably mounted on said eccentric disc and having exterior cylindrical bearing surfaces which slidably engage the pair of cylindrical internal bearing seats on said follower, and a connecting member rotatably mounted between its ends on said crank pin, the ends of said connecting member having spherical bearing surfaces matching and engaging the spherical bearing seats on said follower, the total length of said connecting member between the spherical bearing faces thereof being less than the diameter of said eccentric disc, and the axis of said crank pin being arranged closer to the spherical bearing surface having the greater radius of curvature than to the spherical bearing surface having the smaller radius of curvature.

6. In a driving mechanism, the combination comprising a crankshaft provided with a disc and a crank pin on said disc, a follower fixedly attached to a driven member and provided with two pairs of axially spaced bearing surfaces, a slide rotatably mounted on said disc and slidably engaging one pair of said bearing surfaces on said follower, and a connecting member rotatably mounted on said crank pin and slidably engaging the other pair of said bearing surfaces on said follower.

WERNER HOWALD.

REFERENCES CITED

The following references are of record in the file of this patent:

UNITED STATES PATENTS

| Number | Name | Date |
| --- | --- | --- |
| 2,134,286 | Kipfer | Oct. 25, 1938 |